(12) United States Patent
Suto

(10) Patent No.: US 12,522,216 B2
(45) Date of Patent: Jan. 13, 2026

(54) VEHICLE

(71) Applicant: SUBARU CORPORATION, Tokyo (JP)

(72) Inventor: Tatsuya Suto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 84 days.

(21) Appl. No.: 18/597,678

(22) Filed: Mar. 6, 2024

(65) Prior Publication Data
US 2024/0326820 A1 Oct. 3, 2024

(30) Foreign Application Priority Data

Mar. 31, 2023 (JP) .................................. 2023-056934

(51) Int. Cl.
*B60W 30/182* (2020.01)

(52) U.S. Cl.
CPC ....... *B60W 30/182* (2013.01); *B60W 2552/35* (2020.02); *B60W 2720/10* (2013.01)

(58) Field of Classification Search
CPC ........... B60W 30/182; B60W 2552/35; B60W 2720/10; B60W 10/04; B60W 10/18; B60W 10/20
USPC ................ 701/37, 41, 42, 43, 44, 70, 73, 80
See application file for complete search history.

(56) References Cited

U.S. PATENT DOCUMENTS

| | | | |
|---|---|---|---|
| 9,387,851 B2 * | 7/2016 | Klier | G01S 19/13 |
| 9,662,955 B2 * | 5/2017 | Popham | B60G 17/019 |
| 2014/0188350 A1 | 7/2014 | Popham et al. | |
| 2014/0277988 A1 | 9/2014 | Franganillo et al. | |

FOREIGN PATENT DOCUMENTS

| | | |
|---|---|---|
| JP | 2017-109740 A | 6/2017 |
| JP | 2018-008696 A | 1/2018 |

OTHER PUBLICATIONS

Owner's instruction manual of "Legacy Outback" from Subaru Corporation (pp. 257-259), May 2022.

* cited by examiner

*Primary Examiner* — Hai H Huynh
(74) *Attorney, Agent, or Firm* — Rimon P.C.

(57) ABSTRACT

A vehicle includes a processor. The processor is configured to determine whether a vehicle traveling speed is equal to or higher than a predetermined threshold speed, when the processor receives, while a vehicle travels in a normal traveling mode, a switching instruction. The processor is configured to refrain from switching a vehicle traveling mode to a rough road traveling mode and make a switching reservation of switching the vehicle traveling mode to the rough road traveling mode, when the processor determines that the vehicle traveling speed is equal to or higher than the threshold speed. The processor is configured to switch, based on the switching reservation, the vehicle traveling mode to the rough road traveling mode, when the processor determines that the vehicle traveling speed becomes less than the threshold speed after the vehicle traveling speed is determined as being equal to or higher than the threshold speed.

5 Claims, 3 Drawing Sheets

VEHICLE

CROSS-REFERENCE TO RELATED APPLICATIONS

The present application claims priority from Japanese Patent Application No. 2023-056934 filed on Mar. 31, 2023, the entire contents of which are hereby incorporated by reference.

BACKGROUND

The disclosure relates to a vehicle having multiple vehicle traveling modes.

A vehicle such as an automobile has been proposed in which various controls including an engine characteristic and a shift characteristic are made selectable from multiple modes, based on a preference of a driver who drives the vehicle and a usage state of the vehicle.

For example, Japanese Unexamined Patent Application Publication (JP-A) No. 2018-008696, JP-A No. 2017-109740, and an instruction manual (page 257 to page 259) of "LEGACY OUTBACK" available from SUBARU CORPORATION propose a technique that provides, for example, a rough road traveling mode in addition to a normally-used vehicle traveling mode and makes the vehicle traveling modes switchable by an operation performed by a driver who drives a vehicle. The rough road traveling mode increases an increase rate of an engine torque with respect to an accelerator operation and so changes a shift control that an engine tends to be used at a relatively high rotational speed.

SUMMARY

An aspect of the disclosure provides a vehicle that includes a processor. The processor is configured to switch a vehicle traveling mode between a normal traveling mode and a rough road traveling mode in which an output characteristic of a drive source of the vehicle is different from an output characteristic of the drive source of the vehicle in the normal traveling mode. The processor is configured to: determine whether a vehicle traveling speed is equal to or higher than a predetermined threshold speed, when receiving, while the vehicle travels in the normal traveling mode, a switching instruction configured to switch the vehicle traveling mode to the rough road traveling mode; refrain from switching the vehicle traveling mode to the rough road traveling mode and make a switching reservation of switching the vehicle traveling mode to the rough road traveling mode, when determining that the vehicle traveling speed is equal to or higher than the threshold speed; and switch, based on the switching reservation, the vehicle traveling mode to the rough road traveling mode, when determining that the vehicle traveling speed becomes less than the threshold speed after the determining that the vehicle traveling speed is equal to or higher than the threshold speed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
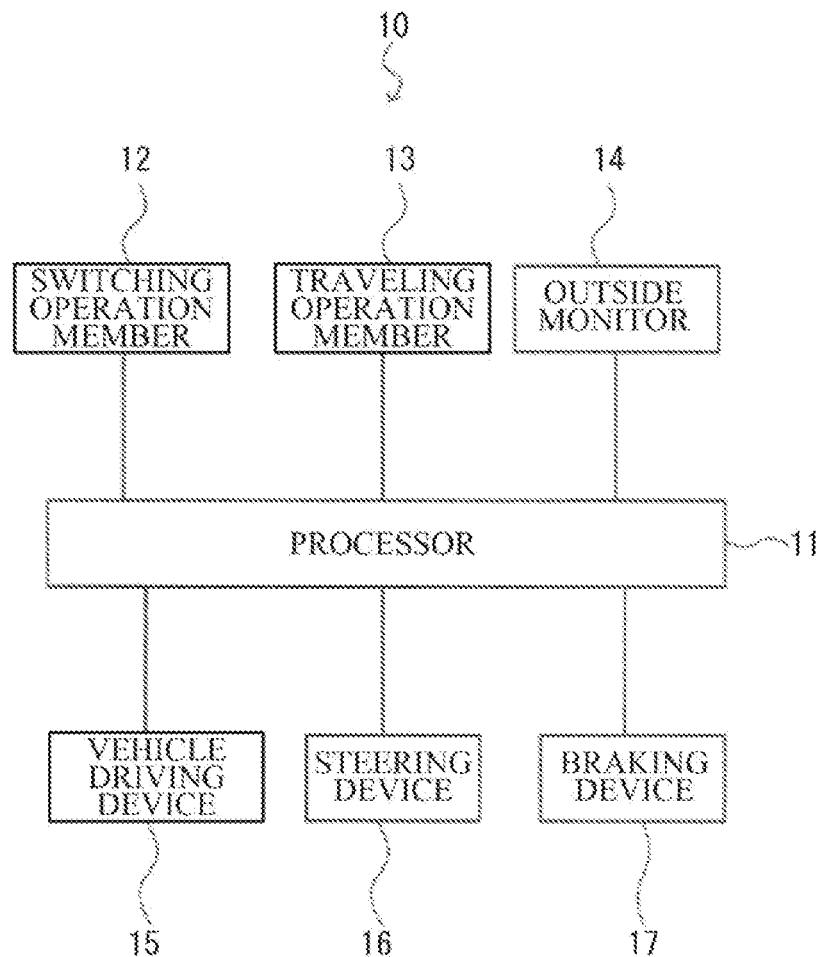
FIG. 1 is a block diagram illustrating a configuration of connection of a vehicle according to one example embodiment of the disclosure.

A technique disclosed in JP-A No. 2018-008696, JP-A No. 2017-109740, and an instruction manual of "LEGACY OUTBACK" has room for improvement from viewpoints of a protection of vehicle components and operability and safety of a driver who drives a vehicle.

For example, a rough road traveling mode is to be used in a low vehicle speed range in order to protect the components of the vehicle. Accordingly, it is difficult to switch to the rough road traveling mode in medium or high speed vehicle range even if the driver performs an operation of executing the rough road traveling mode. In addition, in order to execute the rough road traveling mode, it is necessary for the driver to perform a switching operation manually, which makes it necessary for the driver to divert a line of sight for the switching operation and can reduce the safety.

It is desirable to provide a vehicle that makes it possible to improve operability upon switching a traveling mode of the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Hereinafter, a vehicle 10 according to an example embodiment of the disclosure will be described in detail with reference to the drawings. In the following description, the same members are basically denoted by the same reference numerals, and repetitive description thereof will be omitted.

FIG. 1 is a block diagram illustrating a configuration of connection of the vehicle 10.

The vehicle 10 may be any vehicle such as an engine-driven vehicle, an electric vehicle (EV), a hybrid electric vehicle (HEV), or a plug-in hybrid electric vehicle (PHEV). The vehicle 10 may be a sport-utility vehicle (SUV).

The vehicle 10 may include a processor 11, a switching operation member 12, a traveling operation member 13, an outside monitor 14, a vehicle driving device 15, a steering device 16, and a braking device 17. The switching operation member 12, the traveling operation member 13, the outside monitor 14, the vehicle driving device 15, the steering device 16, and the braking device 17 may be coupled to the processor 11. As will be described later, the vehicle 10 travels in one of multiple vehicle traveling modes, based on an operation performed by an occupant such as a driver who drives the vehicle 10.

The processor 11 may be, for example, an arithmetic element including an arithmetic device or the like that performs various arithmetic operations, for example. The arithmetic element may be a central processing unit (CPU). The processor 11 may control the vehicle driving device 15, the steering device 16, and the braking device 17, based on input data inputted from a device such as the switching operation member 12, the traveling operation member 13, or the outside monitor 14, thereby performing a driving control of the vehicle 10 based on a predetermined vehicle traveling mode. The processor 11 may control, for example, the vehicle traveling mode of the vehicle 10, based on a program stored in an unillustrated storage.

The switching operation member 12 may be a switch to be manually operated by the occupant to switch a vehicle traveling mode M to one of the multiple vehicle traveling modes.

The traveling operation member 13 may be any member to be operated by the occupant to cause the vehicle 10 to travel. Non-limiting examples of the traveling operation member 13 may include a steering wheel, an accelerator pedal, and a brake pedal.

The outside monitor 14 may be a device that monitors a region in front of the vehicle 10. Non-limiting examples of the outside monitor 14 may include a stereo camera that captures an image of a region in front of the vehicle 10, a radar, a sonar, and a light detection and ranging (LiDAR).

The vehicle driving device 15 may generate a driving force of the vehicle 10. Non-limiting examples of the vehicle driving device 15 may include an engine and a motor whose output varies in response to an operation amount of the accelerator pedal. The accelerator pedal may be an example of the traveling operation member 13. In the example embodiment, the vehicle driving device 15 is the engine, although it is not limited thereto.

The steering device 16 may steer wheels, based on an operation amount of the steering wheel. The steering wheel may be an example of the traveling operation member 13.

The braking device 17 may brake the vehicle 10, based on an operation amount of the brake pedal. The brake pedal may be an example of the traveling operation member 13.

Figure 2:
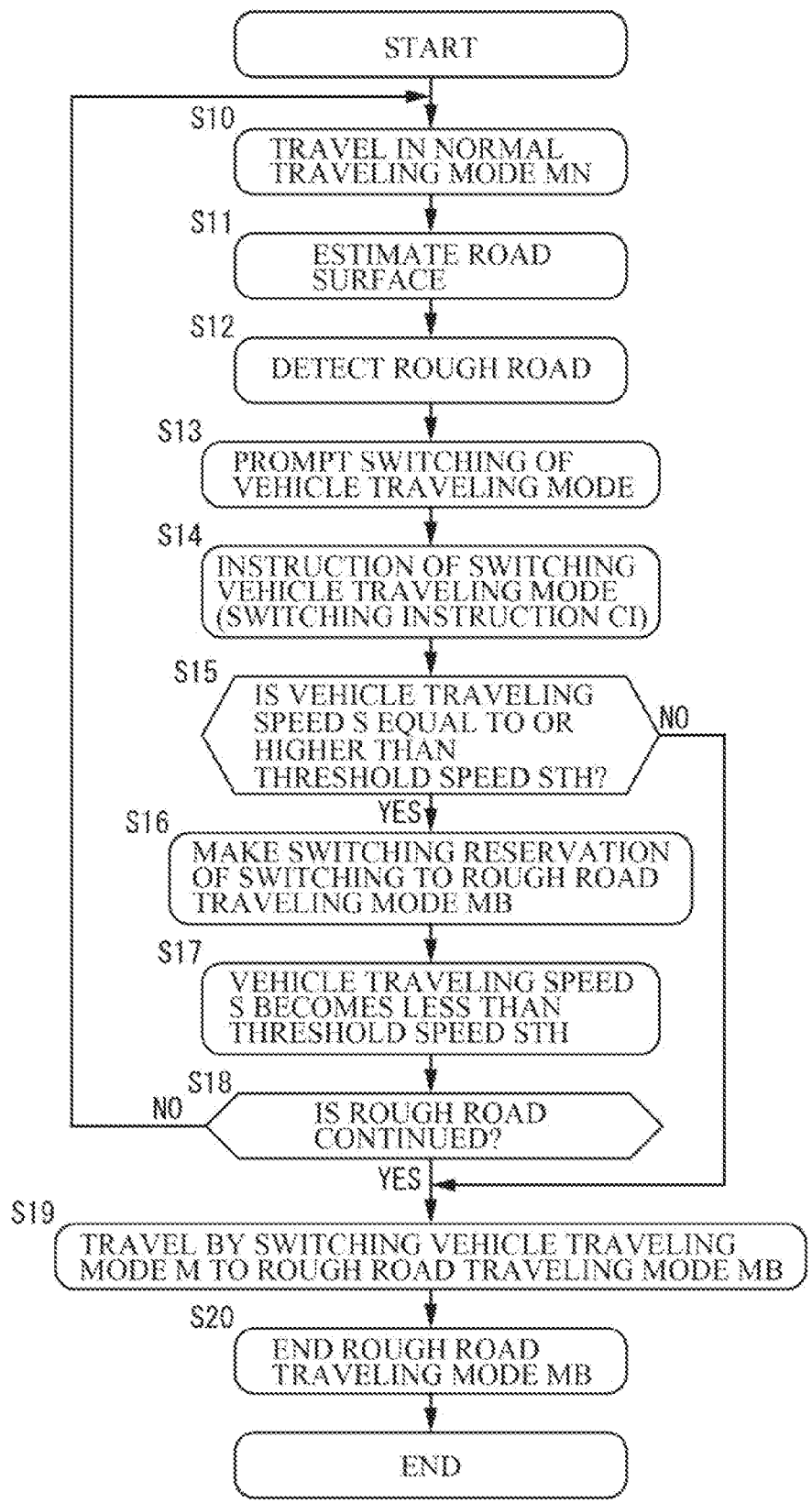
FIG. 2 is a flowchart illustrating an example of a method of switching a traveling mode of the vehicle illustrated in FIG. 1.
Figure 3:
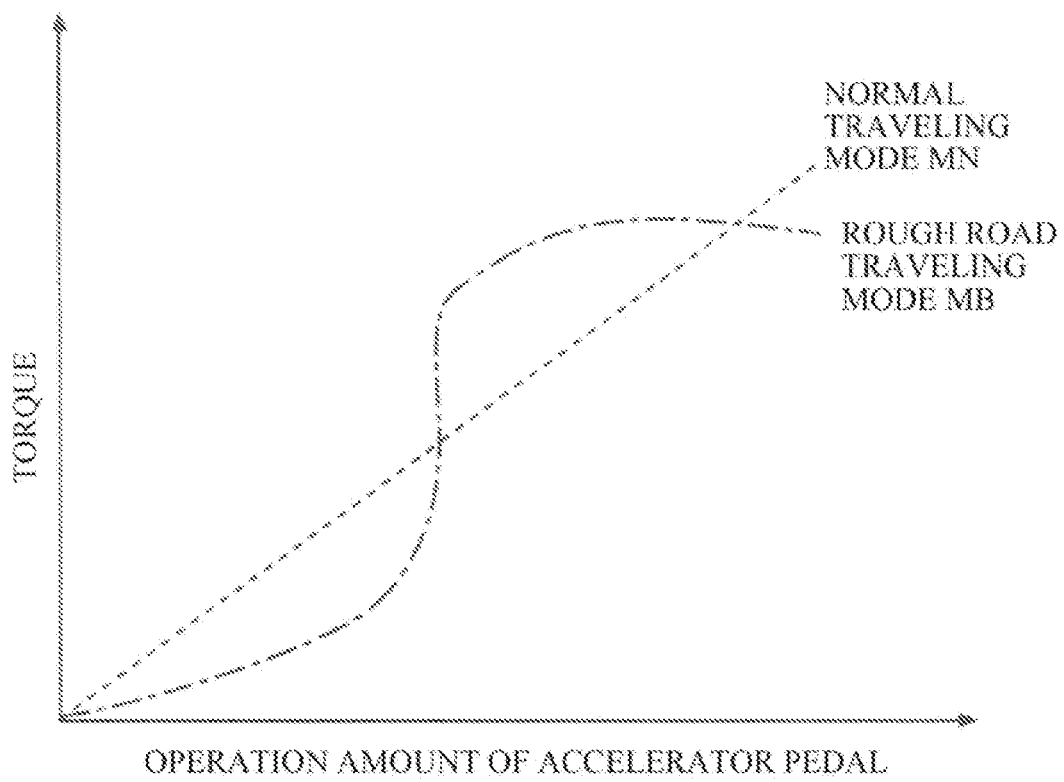
FIG. 3 is a graph illustrating a relationship between an operation amount of an accelerator pedal and a torque of the vehicle illustrated in FIG. 1.

FIG. 2 is a flowchart illustrating an example of a method of switching the traveling mode M of the vehicle 10. FIG. 3 is a graph illustrating a relationship between an operation amount of the accelerator pedal and a torque of the vehicle 10.

First, the vehicle traveling mode M of the vehicle 10 according to the example embodiment will be described with reference to the graph of FIG. 3. In the graph of FIG. 3, a horizontal axis represents the operation amount of the accelerator pedal, and a vertical axis represents a magnitude of a torque generated by the engine.

The vehicle 10 is configured to switch between a normal traveling mode MN and a rough road traveling mode MB as some examples of the vehicle traveling modes of the vehicle 10 for the vehicle traveling mode M.

The normal traveling mode MN may be a traveling mode in which an operation of switching the vehicle traveling mode M is not performed on the switching operation member 12. For example, in the normal traveling mode MN, the operation amount of the accelerator pedal and the torque may be directly proportional to each other.

The rough road traveling mode MB may be the vehicle traveling mode M that is to be selected based on, for example, an operation performed by the occupant upon traveling of the vehicle 10 on a rough road. Non-limiting example of the rough road may include a snowy road, a muddy road, a road having large irregularities, and a field. In the rough road traveling mode MB, a relationship between the operation amount of the accelerator pedal and the torque is different from that of the normal traveling mode MN. For example, when the operation amount of the accelerator pedal is small, the torque in the rough road traveling mode MB may be smaller than the torque in the normal traveling mode MN. When the operation amount of the accelerator pedal increases, the torque in the rough road traveling mode MB may become larger than the torque in the normal traveling mode MN. Employing the rough road traveling mode MB when the vehicle 10 travels on the rough road helps to improve travelability and safety of the vehicle 10 on the rough road.

An example of a method of switching the vehicle traveling mode M of the vehicle 10 from the normal traveling mode MN to the rough road traveling mode MB will be described with reference to FIG. 2 in addition to FIG. 1.

In step S10, the vehicle 10 may travel on a road or the like in the normal traveling mode MN. For example, the vehicle 10 may travel by the vehicle driving device 15, the steering device 16, and the braking device 17, based on an operation performed on the traveling operation member 13 by the occupant. In some embodiments, the vehicle 10 may be subjected to the driving control based on automated driving. In the automated driving, all or a part of the operations of the vehicle driving device 15, the steering device 16, and the braking device 17 may be controlled by the processor 11.

In step S11, the processor 11 may estimate a state of a surface of the road on which the vehicle 10 travels. For example, in some embodiments where the outside monitor 14 is a stereo camera, the outside monitor 14 may capture an image of the road surface on a front side of the vehicle 10, and the processor 11 may estimate the state of the road surface, based on the captured image. In some embodiments, the processor 11 may estimate the state of the road surface, based on a slip rate of the wheels of the vehicle 10. For example, when the slip rate exceeds a threshold, the processor 11 may estimate that the road surface on which the vehicle 10 travels is the rough road. In some embodiments, when a vibration that acts on the vehicle 10 exceeds a threshold, the processor 11 may estimate that the road surface on which the vehicle 10 travels is the rough road.

In step S12, the processor 11 may detect that the road surface on the front side of the vehicle 10 is the rough road. In some embodiments, the processor 11 may detect that the road surface on the front side of the vehicle 10 is the rough road such as a snow road, a muddy road, or road having large irregularities, based on a result of the monitoring performed by the outside monitor 14.

In step S13, the processor 11 may issue, for example, a notification prompting the occupant to switch the vehicle traveling mode M from the normal traveling mode MN to the rough road traveling mode MB. In some embodiments, the processor 11 may output, from a speaker disposed in the vehicle 10, a sound or a voice that prompts the occupant to switch the vehicle traveling mode M. In some embodiments, the processor 11 may perform, on a display disposed in the vehicle 10, displaying that prompts the occupant to switch the vehicle traveling mode M. This configuration helps to allow the occupant to switch the vehicle traveling mode M at an appropriate timing, based on the state of the road surface estimated by the processor 11.

In step S14, the occupant may perform a switching instruction CI adapted to switch the vehicle traveling mode M from the normal traveling mode MN to the rough road traveling mode MB. In some embodiments, the switching instruction CI may be issued based on the switching operation member 12 operated by the occupant. In some embodiments, the switching instruction CI may be issued by the processor 11 without necessitating the operation to be performed by the occupant.

In step S15, when the processor 11 receives the switching instruction CI adapted to switch the vehicle traveling mode M to the rough road traveling mode MB, the processor 11 may determine whether a vehicle traveling speed S is equal to or higher than a predetermined threshold speed STH. In some embodiments, the threshold speed STH may be set in advance within a range from 20 km/h to 35 km/h. The threshold speed STH may be set to a speed at which components of the vehicle 10 are protectable.

If the vehicle traveling speed S is equal to or higher than the predetermined threshold speed STH (YES in step S15), the processor 11 may cause a flow to proceed to step S16.

If the vehicle traveling speed S is less than the predetermined threshold speed STH (NO in step S15), the processor 11 may cause the flow to proceed to step S19.

In step S16, when the vehicle traveling speed S is equal to or higher than the threshold speed STH, the processor 11 may refrain from switching the vehicle traveling mode M to the rough road traveling mode MB. Further, the processor 11 may make a switching reservation of switching the vehicle traveling mode M to the rough road traveling mode MB. Thus, the vehicle 10 may not be switched to the rough road traveling mode MB at the time when the occupant operates the switching operation member 12. However, the vehicle traveling mode M may be switched to the rough road traveling mode MB at the time after step S16 without necessitating the operation of the occupant.

In step S17, the vehicle traveling speed S may become less than the threshold speed STH as a result of a decrease in the vehicle traveling speed S of the vehicle 10.

In step S18, the processor 11 may determine whether the road on which the vehicle 10 travels is the rough road. In some embodiments, the outside monitor 14 may perform imaging of the road in front of the vehicle 10, and the processor 11 may determine whether the road is the rough road, based on a result of the imaging.

If the road surface on which the vehicle 10 travels is the rough road (YES in step S18), the processor 11 may cause the flow to proceed to step S19.

If the road surface on which the vehicle 10 travels is not the rough road (NO in step S18), the processor 11 may cause the flow to proceed to step S10 and the vehicle 10 may travel in the normal traveling mode MN.

In step S19, the processor 11 may switch the vehicle traveling mode M to the rough road traveling mode MB, based on the switching reservation. Accordingly, the vehicle 10 may travel on the rough road by the rough road traveling mode MB. This configuration helps to allow the occupant to safely drive on the rough road by the vehicle 10 set to the rough road traveling mode MB.

In step S20, the occupant may end the rough road traveling mode MB, and the vehicle traveling mode M may be returned to the normal traveling mode MN. In some embodiments, the rough road traveling mode MB may be ended by the operation of the switching operation member 12 performed by the occupant. In some embodiments, the rough road traveling mode MB may be ended by the processor 11. For example, the processor 11 may end the rough road traveling mode MB when the road surface in front of the vehicle 10 is determined as not being the rough road, based on a result of the monitoring performed by the outside monitor 14. The rough road traveling mode MB may be ended based on a determination of the processor 11 when the vehicle traveling speed S of the vehicle 10 becomes equal to or higher than the threshold speed STH, i.e., when the vehicle traveling speed S falls in a medium or high speed range.

The above is the description of an example of the switching of the vehicle traveling mode M of the vehicle 10.

Hereinafter, some inventive concepts to be appreciated from the above-described example embodiment will be described together with example effects thereof.

A vehicle according to at least one embodiment of the disclosure includes a processor. The processor has multiple vehicle traveling modes that include a normal traveling mode and a rough road traveling mode in which an output characteristic of a drive source of the vehicle is different from the output characteristic in the normal traveling mode, and is configured to switch a vehicle traveling mode to be used by the vehicle to one of the vehicle traveling modes. The processor is configured to: determine whether a vehicle traveling speed is equal to or higher than a predetermined threshold speed, when the processor receives, while the vehicle travels in the normal traveling mode, a switching instruction adapted to switch the vehicle traveling mode to the rough road traveling mode; refrain from switching the vehicle traveling mode to the rough road traveling mode and make a switching reservation of switching the vehicle traveling mode to the rough road traveling mode, when the processor determines that the vehicle traveling speed is equal to or higher than the threshold speed; and switch, based on the switching reservation, the vehicle traveling mode to the rough road traveling mode, when the processor determines that the vehicle traveling speed becomes less than the threshold speed after the vehicle traveling speed is determined by the processor as being equal to or higher than the threshold speed.

According to the vehicle of at least one embodiment of the disclosure, it is possible to switch the vehicle traveling mode to the rough road traveling mode after the vehicle traveling speed becomes sufficiently low, after receiving the switching instruction adapted to switch the vehicle traveling mode to the rough road traveling mode. This configuration helps to prevent the vehicle traveling mode from becoming the rough road traveling mode at the time when the vehicle traveling speed is relatively high, and to protect the vehicle components such as a brake. Further, once the switching instruction is received, the vehicle traveling mode is switched, based on the switching reservation, to the rough road traveling mode when the vehicle traveling speed becomes low. This configuration helps to switch, semi-automatically, the vehicle traveling mode to the rough road traveling mode without necessitating the switching instruction again.

In some embodiments, the processor may be configured to: determine whether a road on which the vehicle travels includes a rough road, when the processor determines that the vehicle traveling speed becomes less than the threshold speed; and switch, based on the switching reservation, the vehicle traveling mode to the rough road traveling mode, when the processor determines that the road includes the rough road.

This configuration helps to suppress unnecessary switching of the vehicle traveling mode to the rough road traveling mode when the road is not the rough road, by switching the vehicle traveling mode to the rough road traveling mode when the road on which the vehicle travels is the rough road.

In some embodiments, the processor may be configured to: determine, while the vehicle travels in the normal traveling mode, whether a road on which the vehicle travels includes a rough road; and issue a notification adapted to prompt an occupant of the vehicle to switch the vehicle traveling mode to the rough road traveling mode, when the processor determines that the road includes the rough road.

This configuration helps to allow the vehicle to travel on the rough road in the rough road traveling mode as necessary by prompting the occupant to switch the vehicle traveling mode to the rough road traveling mode, and to improve safety when traveling on the rough road.

In some embodiments, the vehicle may further include an outside monitor configured to perform monitoring of a region in front of the vehicle, in which the processor may be configured to determine whether the road on which the vehicle travels includes the rough road, based on a result of the monitoring performed by the outside monitor.

This configuration helps to eliminate a necessity of providing a dedicated device adapted to detect the rough road by determining whether the road on which the vehicle travels is the rough road, based on the result of the monitoring performed by the outside monitor.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Further, techniques according to the example embodiments and their modification examples described above may be combined in any combination.

The processor 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 11 illustrated in FIG. 1.

The invention claimed is:

1. A vehicle comprising
a processor configured to switch a vehicle traveling mode at least between a normal traveling mode and a rough road traveling mode in which an output characteristic of a drive source of the vehicle is different from an output characteristic of the drive source of the vehicle in the normal traveling mode, wherein
the processor is configured to:
determine whether a vehicle traveling speed is equal to or higher than a predetermined threshold speed, when receiving, while the vehicle travels in the normal traveling mode, a switching instruction to switch the vehicle traveling mode to the rough road traveling mode;
upon determining that the vehicle traveling speed is equal to or higher than the threshold speed, refrain from switching to the rough road traveling mode and reserve the switching until the vehicle speed becomes less than the threshold speed; and
upon determining that the vehicle traveling speed becomes less than the threshold speed after the switching has been reserved, switch to the rough road traveling mode.

2. The vehicle according to claim 1, wherein the processor is configured to:
determine whether a road on which the vehicle travels is a rough road, upon determining that the vehicle traveling speed becomes less than the threshold speed; and
switch the vehicle traveling mode to the rough road traveling mode, upon determining that the road is the rough road and after the switching has been reserved.

3. The vehicle according to claim 2, further comprising an outside monitor configured to perform monitoring of a region in front of the vehicle, wherein
the processor is configured to determine whether the road on which the vehicle travels is the rough road, based on a result of the monitoring performed by the outside monitor.

4. The vehicle according to claim 1, wherein the processor is configured to:
determine, while the vehicle travels in the normal traveling mode, whether a road on which the vehicle travels is a rough road; and
issue a notification to prompt an occupant of the vehicle to switch the vehicle traveling mode to the rough road traveling mode, when determining that the road is the rough road.

5. The vehicle according to claim 4, further comprising an outside monitor configured to perform monitoring of a region in front of the vehicle, wherein
the processor is configured to determine whether the road on which the vehicle travels is the rough road, based on a result of the monitoring performed by the outside monitor.

* * * * *